US006149866A

United States Patent [19]

Luotola et al.

[11] Patent Number: 6,149,866

[45] Date of Patent: Nov. 21, 2000

[54] STOPPER HAVING A CAVITY FOR REAGENTS AND AN ASSAY METHOD USING SAID STOPPER

[75] Inventors: Juhani Luotola; Henry Backman; Tapani Hellman; Kauko Kahma, all of Espoo; Antti Kaplas, Kerava, all of Finland

[73] Assignee: Orion-yhtyma Oyj, Espoo, Finland

[21] Appl. No.: 09/011,853

[22] PCT Filed: Jun. 18, 1997

[86] PCT No.: PCT/FI97/00388

§ 371 Date: Feb. 19, 1998

§ 102(e) Date: Feb. 19, 1998

[87] PCT Pub. No.: WO97/48492

PCT Pub. Date: Dec. 24, 1997

[30] Foreign Application Priority Data

Jun. 19, 1996 [FI] Finland .................................... 962542

[51] Int. Cl.[7] ...................................................... G01N 21/75

[52] U.S. Cl. ............................ 422/58; 206/217; 206/222; 206/569; 215/227; 215/228; 215/250; 215/307; 220/202; 220/212; 220/800; 220/801; 422/61; 422/102

[58] Field of Search ................................ 422/58, 61, 102; 436/165; 435/288.1, 288.2, 304.1, 304.2; 206/219, 222, 569; 215/227, 228, 250, 307; 220/202, 212, 800, 801

[56] References Cited

U.S. PATENT DOCUMENTS

| | | |
|---|---|---|
| 3,715,189 | 2/1973 | Nighohossian et al. . |
| 3,756,390 | 9/1973 | Abbey et al. . |
| 4,192,429 | 3/1980 | Yerman .................................. 215/307 |
| 4,221,291 | 9/1980 | Hunt . |
| 5,496,288 | 3/1996 | Sweeney . |
| 5,752,940 | 5/1998 | Grimard . |

FOREIGN PATENT DOCUMENTS

| | | |
|---|---|---|
| 0 093 090 A2 | 11/1983 | European Pat. Off. . |
| 0 215 735 A1 | 3/1987 | European Pat. Off. . |

*Primary Examiner*—Jan Ludlow
*Attorney, Agent, or Firm*—Pollock, Vande Sande & Amernick

[57] ABSTRACT

The invention relates to a closure device and a method for performing an assay of a sample using the closure device. The closure device, mountable on the mouth of a test vessel, comprises a body part (1) with an axially passing cylindrical bore. The bore is covered at one end with an openable lid (7). The closure device further includes a plunger (3), slidably mounted in the bore for the formation of a sealed reagent storage chamber (9) in the space remaining between the closed lid and the plunger. The inner wall of the bore (2) is provided with at least one groove (4), whose depth is so deep as not to be within the reach of the outer diameter of the plunger (3). The groove extends from exterior end of the bore, over such a length as to maintain a gas flow communication between said reagent storage chamber (9) and the exterior end of the cylindrical bore when the plunger (3) is in a partially inserted position. In the assay method according to the invention, the reagent is added from the closure into the test vessel containing the sample.

12 Claims, 2 Drawing Sheets

STOPPER HAVING A CAVITY FOR REAGENTS AND AN ASSAY METHOD USING SAID STOPPER

BACKGROUND OF THE INVENTION

The present invention relates to a closure device suitable for use in performing an assay, particularly a clinical test on a biological fluid such as blood. It is an object of the invention to provide a closure device which can render the reagent used in the assay into a state assuring a reliable test result and is able to maintain this state of the reagent over a long period of storage as well as under the stress of adverse environmental conditions, and furthermore to permit the addition of the reagent into the sample under assay at a desired time.

There is a need to provide a closure device permitting the assay to be carried out under maximally protected conditions thus eliminating the error factors imposed on the assay results by the environment and reducing the contamination risk imposed by the assay on the environment.

These goals and others can be attained by virtue of the closure device according to the invention, the device having its basic construction designed into a closure assembly suitable for closing the diagnostic test vessel, into which closure device the reagent after its preparation into an advantageous state for the assay is sealed in a manner permitting the release of the reagent from the closure device into the diagnostic test vessel at a desired instant of time.

Closure devices having a similar basic construction are known in the art, and their use has been contemplated in, e.g., the preparation of pharmaceuticals. In this application, the effective therapeutic drug is prepared from its basic constituents not earlier than at its required instant of use, whereby one or a number of the constituents of the pharmaceutical product are added to the other constituents stored in a medicine bottle or similar container just before the use of the drug. Prior to its addition, the first constituent(s) may have been stored in a closed space such as, e.g., the closure of the medicine bottle, wherefrom it can be taken into use by depressing or similarly actuating action on the closure, the action opening a passageway from the interior of the closure into the medicine bottle. Closure devices having this basic construction are described, i.a., in patent publications GB 1,193,989, GB 1,479,370, EP 0,093,090, EP 0,338,349, EP 0,561,322 and EP 0,344,849.

These conventional closures fail, however, to take into account the fact that a successful test in a great number of medical or similar applications requires the reagent used in the test to be in an advantageous state for the assay and that this state can be maintained up to the test instant, which instant may be essentially deferred from the ready-for-use manufacturing instant of closure device. Moreover, the circumstances prevailing during the standby period of the closure ready-for-use state may have been unfavorable to the stability of the reagent, particularly if the test kit is intended for field use.

SUMMARY OF THE INVENTION

An essential improvement capable of overcoming these problems is offered by a closure device according to the present invention having the basic construction of a sealing closure for a diagnostic test vessel or similar container. The sealing closure comprises a body part, which is tightly mountable in the mouth of the vessel and is axially made open with a cylindrical bore. The body part further includes a lid for closing the bore end facing the test vessel in an openable manner, and a plunger with a diameter compatible with the bore of the body part. The plunger is slidably mounted in the bore so as to permit its movement into a sealed position with respect to the body part thus effecting the formation of a sealed reagent storage chamber in the space remaining between the lid of the body part bore end and the plunger.

The invention also concerns a method of assaying a sample, particularly a biological fluid, by way of reacting the sample in the test vessel with the assaying reagent formed by a reagent aliquot stored in the sealed closure and released from the closure into the test vessel. Furthermore, the invention concerns a test kit for clinical assay of a sample such as a blood sample. The test kit is characterized by including at least one test vessel sealed with a closure containing the reagent of the assay, the reagent having been subjected to a treatment step before the closure device is gas-tightly sealed off from communication with the ambient atmosphere.

BRIEF DESCRIPTION OF THE DRAWINGS

In the following, the invention will be examined in greater detail by making reference to the appended drawings in which.

DETAILED DESCRIPTION OF THE INVENTION

Figure 1:
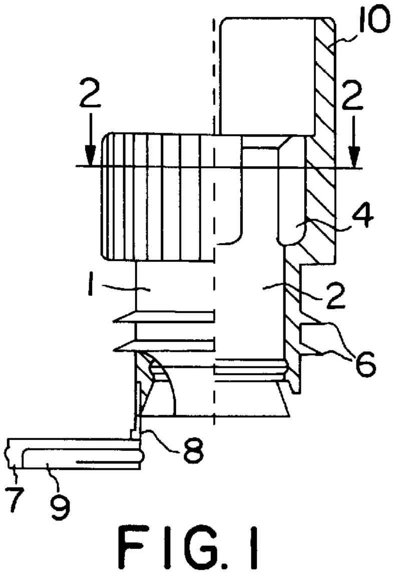
FIG. 1 shows a partially sectioned view of the body part of the closure device according to the invention.

Referring to FIG. 1, the basic element of the closure device according to the invention shown therein comprises a stopper-type body part 1 shaped and dimensioned so as to fit tightly on the mouth of a vessel such as a test or reaction vessel. For tight mounting inside the mouth of the vessel, the embodiment of the body part illustrated in the diagram has annular seal ridges 6 on its skirt. Obviously, the body part may also be adapted for mounting exterior to the vessel mouth, whereby the closure device requires new shaping and dimensioning of the body part by means of conventional techniques.

Figure 2:
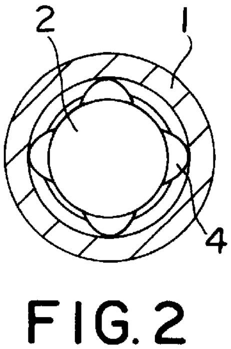
FIG. 2 shows a cross-sectional view of the body part of FIG. 1 in the plane 2—2.
Figure 3:
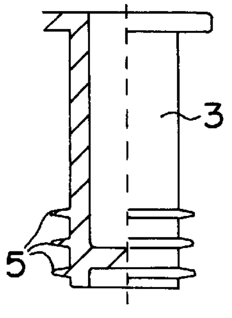
FIG. 3 shows a partially sectioned view of the other basic part of the closure device according to the invention.

To implement the structure of the closure according to the invention, the closure is provided with an axially passing cylindrical bore 2, which is best visible in the diagram of FIG. 2. A plunger 3 dimensioned to be insertable into this bore and axially movable therein with a sliding fit is shown in FIG. 3. For a tight seal between the inner surface of the closure body part bore 2 and the plunger 3, the plunger skirt is provided with a number of circular seal ridges 5 spaced apart at a distance from each other, the ridges having a special function to be described later.

In accordance with this embodiment of the invention, the inner wall of the centrally passing bore 2 is provided with grooves 4 running axially along the bore wall. These grooves start from that end of the body part which is oriented outward from the test vessel when the body part 1 is inserted on the mouth of the test vessel. The grooves 4 extend from the mouth of the test vessel over a certain axial length of the body part bore. The depth of the grooves 4 is made so deep as to prevent the seal ridges 5 of the plunger 3 from plugging the grooves in any inserted position of the plunger in the body part bore.

An essential element of the body part 1 is a lid structure 7 made to that end of the body part which is intended to face the interior of the test vessel when the body part is mounted on the mouth of the test vessel. The function of the lid 7 is to close the vessel-side end of the bore 2 passing through the body part so as to permit an opening of the bore if so required. The opening of the lid is performed in a conventional manner by means of actuating the plunger 3 slidably adapted into the bore 2. The lid 7 is advantageously connected to the body part by means of a hinge 8, which secures the lid to the body part during the different operating states of the closure device. The inner surface of the lid 7 may include a sunken recess 9, which in its part forms a portion of the space provided inside the closure device for accommodating the test reagent to be sealed therein.

The annular seal ridges 5 of the plunger 3 are located close to the plunger end facing the interior of the test vessel. These ridges, the number of which being three in the illustrated embodiment, facilitate a stepwise assembly of the closure so as to maintain a gas flow communication to the ambient atmosphere from the space of the bore remaining between the closed lid 7 and the lower end of the plunger 3 facing the lid. This condition will be evident from the mutual position of the body part 1 and the plunger 3 illustrated in FIG. 4, wherein the seal ridges 5 of the plunger 3 are still positioned in the area of the grooves 4 made to the body part. When the plunger is pushed further inward, the lower ridges 5 of the plunger will reach the ungrooved wall area of the body part bore 2, thus isolating the space under the plunger from communication with the ambient atmosphere.

Figure 4:
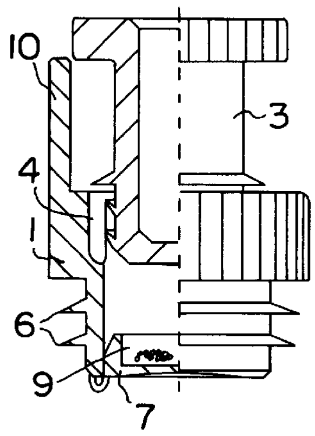
FIG. 4 shows a partially sectioned view of the closure device according to the invention assembled into its ready-for-filling state.

The assembly state of the device shown in FIG. 4, which permits gas flow communication between the reagent space 9 and the ambient atmosphere, can be utilized in the preparation of the reagent already filled into the space 9. Such a treatment may comprise, e.g., bringing the reagent into a state suitable for use in the assay and/or into a state required for the storage and handling steps of the reagent prior to the assay. Such a preparation step may include lyophilization by dry-freezing of the assay reagent and/or storage thereof under an inert gas atmosphere, sterilization of the reagent or other conventional operation which can be carried out under gas flow communication with the ambient atmosphere.

Exemplifying applications of the present closure device include assay methods based on optical measurements, in which assays the reagent must be properly dosed and prepared into a state suitable for the assay. Accurate dosing of the reagent may require charging the closure with paste-form reagent, after which the reagent must be brought into granular form for a quick assay reaction. This step can be accomplished by using above-mentioned lyophilization for moisture removal from the reagent paste.

Figure 5:
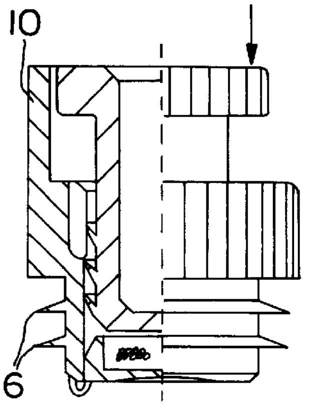
FIG. 5 shows a partially sectioned view of the closure device according to the invention in its ready-for-use storage state.
Figure 6:
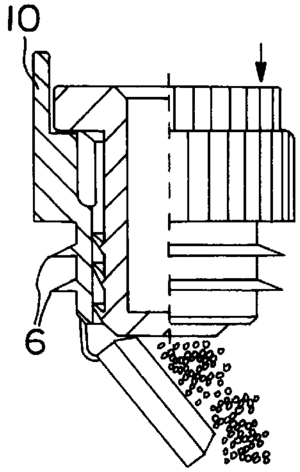
FIG. 6 shows a partially sectioned view of the closure device according to the invention in its operating state.
Figure 7:
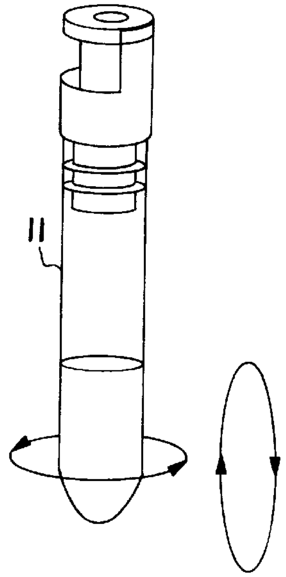
FIG. 7 shows the preparation step situation of an embodiment of the assay method according to the invention based on the use of the closure device according to the invention.
Figure 8:
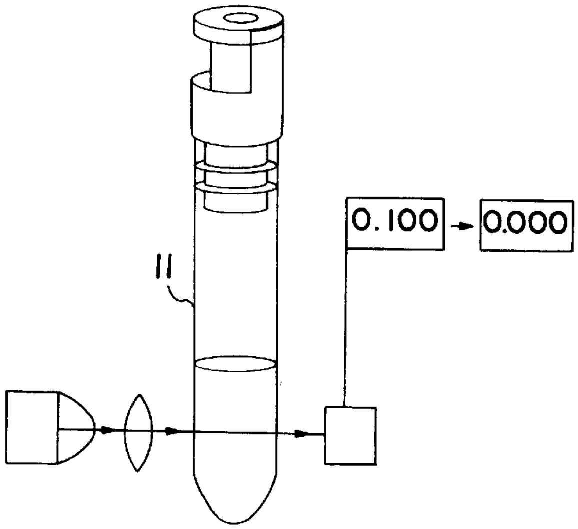
FIG. 8 shows the calibration assay step following the step of FIG. 7 in the embodiment of the assay method according to the invention.
Figure 9:
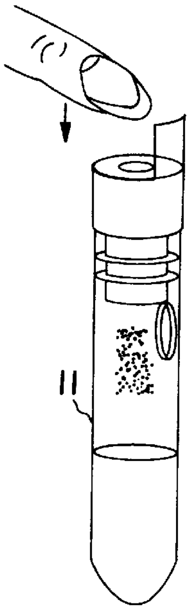
FIG. 9 shows the use of the closure device according to the invention in the assay method.
Figure 10:
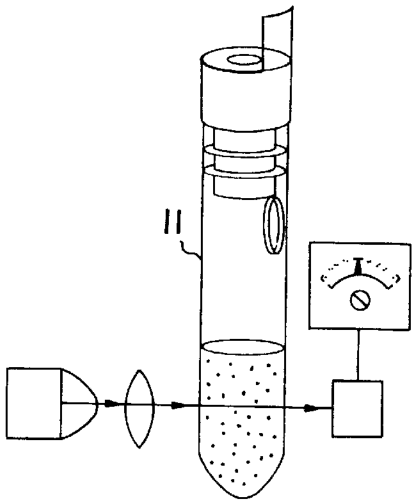
FIG. 10 shows the actual measurement step of the assay method.

In the assay step, the plunger inserted in the body part 1 is pushed from its initial position shown in FIG. 5 into a position shown in FIG. 6, whereby the plunger forces the lid 7 at the interior end of the body part bore 2 to snap open. Then, the reagent stored in the space 9 can fall into the test vessel in which the assay can be performed in a conventional manner.

In order to control the mutual inserted positions of the plunger 3 and the body part 1 and thus to show the operating states of the closure device, the body part is advantageously provided with a position indicator or stop 10. When the plunger 3 is pressed down into a certain position with respect to this stop, whose positions are indicated in FIGS. 4, 5 and 6, the correct position of the plunger for each intended operation can thus be verified. Simultaneously, the stop acts as a protection against undesirable function, whereby the plunger and stop can be connected by means of a securing seal with each other when the closure device is in its storage, or ready-for-use, state shown in FIG. 5.

The method according to the invention is elucidated in the diagrams of FIGS. 7–10.

In quantitative and qualitative immunological assays, generally either an antibody or antigen concentration is measured from biological fluids, excreta or tissue fluids (such as blood, sera, plasma, spinal fluid, pleural exudate, ascites, pus, wound suppuration, urine, sputum, faeces, pharyngeal smear sample, etc.). The tests may be direct, indirect or inhibitory by their nature. In immunological assays, the antibody binds to an antigen structure which is specific to said antibody. Prior to the assay, either the antibody or alternatively the antigen may be bound to a specific labelling indicator (marker). Such a marker is selected from the group of, i.a., polymeric particles (including dyed and magnetic particles), colloidal gold, stained substrates, fluorescent and phosphorescent molecules and luminescent molecules.

Quantitative assays typically utilize analyzer equipment based on optical measurement techniques (absorbance, extinction, nephelometry, reflectance, fluorescence, phosphorescence, luminescence and others). In most cases, such an optical measurement presumes elimination of error-causing optical background factors (such as lipid concentration, icterus index and other variables of the sample dependent on the status of the patient).

This background elimination is called the blank sample assay which is performed by the equipment prior to the assay of the actual analyte. After the measurement of the blank sample, the analysis equipment used in the assay starts to detect the reaction of the sample analyte with the specific reagent added to the sample solution, which is detected from a signal change chosen to be independent from other optical properties of the sample. The signal change is selected to be proportional to the analyte concentration to be assayed in the sample.

The device and method according to the invention facilitate accurate assay of the analyte in such samples as whole blood which may have widely differing background properties.

To make the background elimination possible (using a blank sample), the reagent for the specific reaction with the analyte to be assayed is added to the sample only after the background eliminating measurement. This sequence is facilitated by the closure device according to the invention. In the method according to the invention, the reagent space 9 is filled with a specific labelling compound of an immunological test, whereby the marker may be either in the form of a free reagent (e.g., an enzyme substrate) or bound to an antibody or antigen (e.g., a substance labelled with marker particles or colloidal gold). Then, the antibody or antigen molecules can provide the required signal for the assay. Optical techniques are used to detect reagent binding or color change, whereby kinetic measurements are possible if so required. In a measurement system, the closure device according to the invention can be used as the stopper of the assay cuvette.

In a test, into an assay cuvette 11 (refer to FIG. 7) is added a required amount of buffer solution, which in the present invention is selected such that it can perform a possibly required preparatory reaction (e.g., disintegration of red blood cells, known as hemolysis, or the inactivation of the Clq component of the complement of the rheumatoid factor, which is a detrimental factor in other immunological assays) in the sample to be introduced in the cuvette. After the addition of the buffer solution and the sample, the cuvette can be sealed with a device according to the invention, which acts as the closure of the cuvette, and the contents of the cuvette are stirred. Because the reagent space 9 at this stage is still separated from the sample cuvette, the labelling compound cannot mix with the solution formed by the sample and the buffer.

When required, some of the reagents such as, e.g., a hemolyzing compound (saponin) or red blood cells agglutinating compound (lectin) may be placed on the outer surface of the lid 7 in the closure device, whereby the compound can accomplish a desired preliminary reaction (hemolysis, agglutination of red blood cells) prior to the actual immunological reaction.

After the preliminary treatment (refer to FIG. 8), the sample cuvette is placed in an optically-measuring assay apparatus and the first measurement step of background elimination is carried out (on the blank sample).

After the background elimination, the passageway from the reagent space 9 of the closure device to the interior of the sample cuvette is opened (refer to FIG. 9) by depressing the plunger of the device thus forcing the lid 7 to open. When the lid is open, the specific labelling compound is flushed from the space 9 by stirring the assembly formed by the closure device and the cuvette. Subsequent to this reagent addition step, the specific reaction of the labelling compound with the analyte can be measured by optical methods (refer to FIG. 10) without interference from the sample background.

Thence, the present invention facilitates uncomplicated storage, transfer and accurate dosing of the specific reagent at a desired instant of time. Furthermore, the invention can be utilized as a functional part of an analytic system or assay package (test kit).

In the following, the function of the invention will be elucidated by way of examples. As the examples described below are given to illustrate only a few specific applications of the above immunological assay, they must not be construed to limit the spirit of the invention or its applications.

EXAMPLE 1

C-reactive protein (CRP) is a generally adopted indicator of an inflammation, which makes its assay from a whole-blood or serum sample of the patient a standard routine. In conjunction with CRP assay, the sample is typically analyzed using a system based on optical techniques (absorbance, extinction, nephelometry, reflectance, fluorescence, phosphorescence and others). The measurement requires a preliminary measurement on the sample (blank sample) for background elimination, whereby this step is carried out by the system prior to the assay of the actual analyte. The sample cuvette may contain different types of buffer solutions. In practice, the measurement for background elimination in CRP assay is performed by adding the whole-blood or serum sample into a sample cuvette containing a hemolytic buffer solution. Alternatively, the hemolytic reagent can be placed on the outer surface of the lid facing the sample solution. Then, the sample to be assayed may be dosed into the cuvette by means of, e.g., a capillary syringe equipped with a plunger. Next, the cuvette is closed with the closure device according to the invention serving as the stopper of the cuvette, after which the buffer solution and the sample are stirred. Subsequent to the stirring of the sample and hemolysis of red blood cells in the buffer solution, the sample cuvette is placed in the analytic apparatus. The background measurement reading of the sample is recorded and set as the zero value of the sample (blank sample).

After the background elimination of the sample, the apparatus records the reaction with the CRP of the specific reactant initiated by the release of the latter from the closure device according to the invention and subsequent mixing thereof with CRP, whereby a signal change independent from other optical properties of the sample is obtained. Thence, the signal change is made proportional to the concentration of CRP in the sample being assayed. This arrangement facilitates an accurate assay of CRP concentration in samples of widely differing background characteristics such as whole blood.

To make background elimination possible (on the blank sample), the specific reagent for CRP assay can be added only after the background elimination step. In said method, the reagent space 9 contains dry-freezed (lyophilized) polymer particles coated with CRP antibodies. As the CRP molecules will bind specifically to the antibody molecules, thus causing aggregation of the coated polymer particles, too, a dynamic measurement of the kinetic reaction by optical techniques is possible. Obviously, any other type of commonly used markers can be used (such as colloidal gold, magnetic particles, dyed particles, stained aggregates and others).

EXAMPLE 2

Assay of the rheumatoid factor (RF) is extremely important in the diagnosis of different rheumatic diseases. An RF assay can be performed directly on a whole-blood or serum sample. In this test, the specific labelling particles are coated with human immunoglobulin-G molecules. In addition to the hemolyzing compound, the buffer solution of the assay reaction may contain polyanionic molecules, which bind to the Clq component of the so-called complement that otherwise could undergo a nonspecific reaction with the actual RF-labelling agent by way of binding to the Fc fragment of immunoglobulin-G. The steps of the actual test are performed in the same sequence as in Example 1. Subsequent to the addition of the blood sample, the polyanionic molecules of the assay buffer bind to the Clq component thus effectively preventing a nonspecific reaction, while the disintegration (hemolysis) of red blood cells occurs simultaneously if a whole-blood sample is being assayed. After the addition of the sample, the background elimination (using the blank sample) is performed in the same manner as in Example 1. The actual specific reaction is initiated by opening the lid 7 of the closure device according to the invention, whereby the particles coated with human immunoglobulin-G react with the RF. The aggregates formed herewith are measured in the same manner as in Example 1.

What is claimed is:

1. A closure device suitable for use in performing an assay, said device having its basic construction designed into a closure assembly suitable for closing a diagnostic test vessel, said closure device comprising a body part, which is suitable for tight mounting on a mouth of said vessel and is provided with a cylindrical bore, said body part including a lid suited for closing the body part bore end facing said diagnostic test vessel in an openable manner, and a plunger with a diameter compatible with the bore of the body part, said plunger being slidably mounted in the bore so as to permit its movement into a sealed position with respect to the body part thus effecting the formation of a sealed reagent storage chamber in the space remaining between the lid and the plunger and into an opening position effecting the opening of the lid, wherein an inner wall of the bore passing axially through said body part is provided with at least one groove, whose radial depth is so deep as not to be within the reach of the outer diameter of the plunger, said groove extending from the end of the bore into which the plunger is inserted, axially along the inner wall of the bore, over such a length of the bore wall as to maintain a gas flow communication between said reagent storage chamber and the end of the cylindrical bore when the plunger is mounted into a partially inserted position.

2. A closure device as defined in claim 1, wherein said lid is connected by a hinge to said body part.

3. A closure device as defined in claim 1, wherein said body part is detachably mountable on the mouth of the diagnostic test vessel.

4. A closure device as defined in claim 1, wherein the inside of said lid is recessed to form the reagent storage chamber.

5. A closure device as defined in claim 4, wherein said lid is connected by a hinge to said body part.

6. A closure device as defined in claim 1, wherein said body part includes a stop for controlling said partially inserted position of said plunger.

7. A closure device as defined in claim 6 wherein the inside of said lid is recessed to form the reagent storage chamber.

8. A closure device as defined in claim 6, wherein said lid is connected by a hinge to said body part.

9. A closure device as defined in claim 6, wherein said body part is detachably mountable on the mouth of the diagnostic test vessel.

10. A closure device as defined in claim 6, wherein said stop also permits the control of the end position of the fully inserted plunger.

11. A closure device as defined in claim 10 wherein the inside of said lid is recessed to form the reagent storage chamber.

12. A closure device as defined in claim 10, wherein said lid is connected by a hinge to said body part.

* * * * *